(12) United States Patent
Min, I et al.

(10) Patent No.: US 11,562,336 B2
(45) Date of Patent: Jan. 24, 2023

(54) PAYMENT AUTHORIZATION SYSTEM

(71) Applicant: PAYPAL, INC., San Jose, CA (US)

(72) Inventors: Eric Byungho Min, I, San Jose, CA (US); Margaret A. Strong, Spicewood, TX (US)

(73) Assignee: PAYPAL, INC., San Jose, CA (US)

( * ) Notice: Subject to any disclaimer, the term of this patent is extended or adjusted under 35 U.S.C. 154(b) by 433 days.

(21) Appl. No.: 16/174,712

(22) Filed: Oct. 30, 2018

(65) Prior Publication Data

US 2019/0244185 A1   Aug. 8, 2019

Related U.S. Application Data

(63) Continuation of application No. 14/476,247, filed on Sep. 3, 2014, now Pat. No. 10,115,089.

(51) Int. Cl.
G06Q 20/12 (2012.01)
G06Q 20/40 (2012.01)
H04L 67/02 (2022.01)
G06Q 20/32 (2012.01)

(52) U.S. Cl.
CPC ............. *G06Q 20/12* (2013.01); *G06Q 20/40* (2013.01); *G06Q 20/4014* (2013.01); *G06Q 20/4016* (2013.01); *H04L 67/02* (2013.01); *G06Q 20/322* (2013.01)

(58) Field of Classification Search
CPC ...................................................... H04L 67/02
See application file for complete search history.

(56) References Cited

U.S. PATENT DOCUMENTS

| | | | |
|---|---|---|---|
| 6,018,724 | A | 6/2000 | Arent |
| 7,024,691 | B1 | 4/2006 | Herzberg et al. |
| 7,080,048 | B1 | 7/2006 | Sines et al. |
| 7,958,555 | B1 | 6/2011 | Chen et al. |
| 9,270,450 | B2 | 2/2016 | Roscoe |

(Continued)

FOREIGN PATENT DOCUMENTS

CA    2873695 A1 * 10/2013 ........... G06F 16/951

*Primary Examiner* — John W Hayes
*Assistant Examiner* — Dennis G Keritsis
(74) *Attorney, Agent, or Firm* — Haynes and Boone, LLP

(57) ABSTRACT

Systems and methods for providing a payment authorization system include a payment authorization device that receives, through communication over a network with at least one of a user device and a payment provider device, a request to authenticate a merchant virtual storefront. The request may be received in association with a merchant virtual storefront transaction request. The payment authorization device also retrieves identifying information associated with the merchant virtual storefront. Additionally, the payment authorization device may retrieve, from a database located in a non-transitory memory, baseline identifying information for comparison to the retrieved identifying information. The payment authorization device determines an authenticity of the merchant virtual storefront based on the retrieved identifying information and subsequently authorizes the merchant virtual storefront transaction request. In some cases, prior to authorizing the merchant virtual storefront transaction request, the payment authorization device requests approval from a third-party approver.

20 Claims, 15 Drawing Sheets

(56) References Cited

U.S. PATENT DOCUMENTS

| | | | |
|---|---|---|---|
| 9,830,587 B1* | 11/2017 | Bell | G06Q 20/322 |
| 2002/0002512 A1 | 1/2002 | Harpale | |
| 2002/0174062 A1* | 11/2002 | Sines | G06Q 20/02 |
| | | | 705/40 |
| 2005/0015304 A1* | 1/2005 | Evroni | G06Q 20/04 |
| | | | 705/26.41 |
| 2005/0222961 A1 | 10/2005 | Staib et al. | |
| 2008/0046738 A1* | 2/2008 | Galloway | H04L 63/1416 |
| | | | 713/176 |
| 2009/0133118 A1 | 5/2009 | Beattie et al. | |
| 2009/0254463 A1* | 10/2009 | Tomchek | G06Q 30/06 |
| | | | 705/30 |
| 2010/0223187 A1 | 9/2010 | Fujita et al. | |
| 2011/0022837 A1* | 1/2011 | Stevens | H04L 63/0823 |
| | | | 726/5 |
| 2012/0150750 A1* | 6/2012 | Law | H04L 67/02 |
| | | | 705/76 |
| 2012/0323717 A1* | 12/2012 | Kirsch | G06Q 20/3829 |
| | | | 705/26.1 |
| 2013/0246272 A1* | 9/2013 | Kirsch | G06Q 20/3821 |
| | | | 705/44 |
| 2014/0214671 A1* | 7/2014 | Desilva | G06Q 20/405 |
| | | | 705/44 |
| 2016/0034898 A1 | 2/2016 | Ghosh | |
| 2017/0048218 A1* | 2/2017 | Lindemann | G06Q 20/40145 |

\* cited by examiner

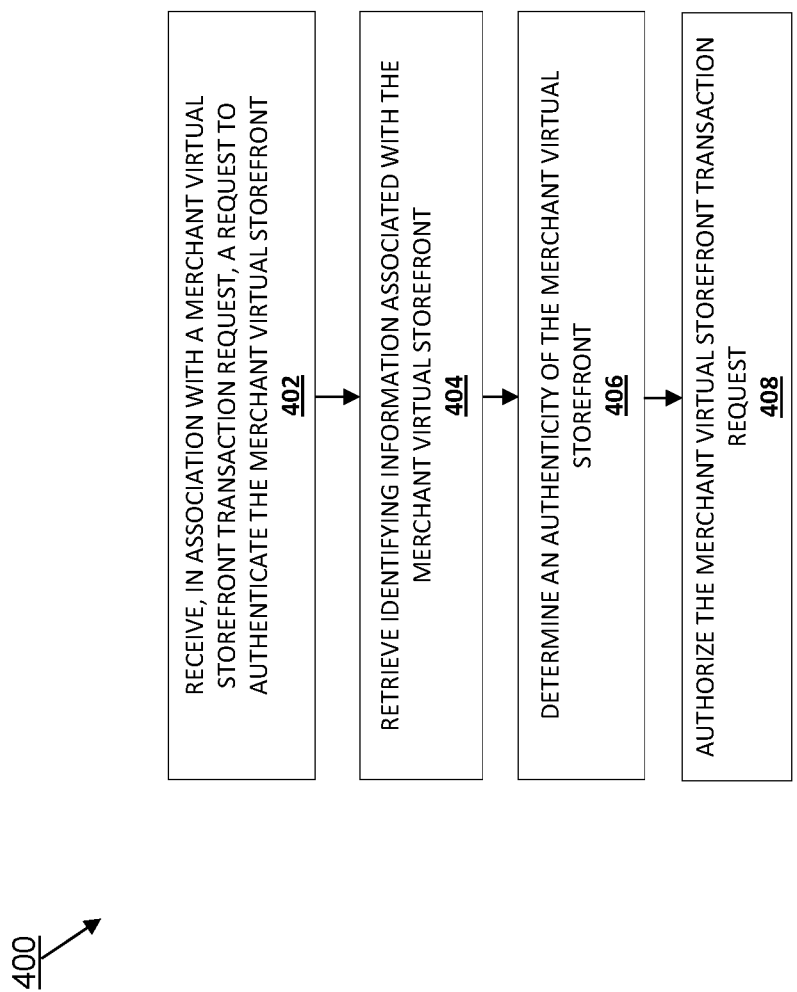

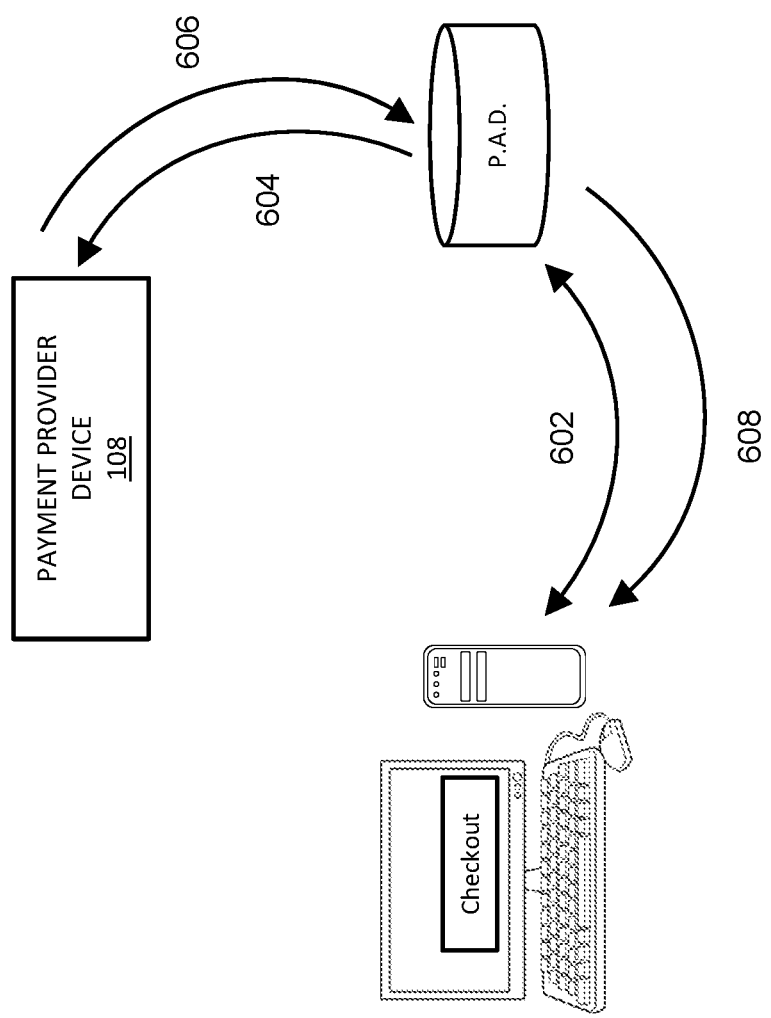

PAYMENT AUTHORIZATION SYSTEM

CROSS-REFERENCE TO RELATED APPLICATIONS

This application is a continuation application of U.S. patent application Ser. No. 14/476,247, filed on Sep. 3, 2014, which will issue as U.S. Pat. No. 10,115,089, the disclosure of which is herein incorporated by reference in its entirety.

BACKGROUND

The present disclosure generally relates to online and/or mobile payments, and more particularly to an authentication device that interfaces with a user device to authenticate a merchant website and facilitate a payment transaction.

More and more consumers are purchasing items and services over electronic networks such as, for example, the Internet. Consumers routinely purchase products and services from merchants and individuals alike. The transactions may take place directly between a conventional or online merchant or retailer and the consumer, and payment is typically made by entering credit card or other financial information. Transactions may also take place with the aid of an online or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

Some payment service providers provide online and mobile payment services for conventional merchants (e.g., with a merchant physical location) and/or online merchants (e.g., without a merchant physical location) in order to allow customers to make purchases from such merchants while benefitting from the convenience and security offered by the payment service provider. When shopping online, for example via a website of either a conventional or online-only merchant, customers may be susceptible to online fraud such as hacking, phishing, spoofing, identity theft, etc. In particular, certain groups may be more susceptible than others to such online fraud. For example, children, some elderly individuals, or others that may not have extensive experience and familiarity with current methods of online payments are often the unsuspecting targets of online fraud. In some instances, an individual may be aware of the possibility of online fraud but may not know how to identify or deal with the fraud. Thus, such potential customers may avoid conducting online transactions altogether, or they may spend an inordinate amount of time researching a website, a payment service provider, a merchant, etc., before making an online purchase.

The present disclosure describes various examples of embodiments that provide customers with a convenient, secure, and reliable way to avoid online fraud and confidently conduct online purchase transactions.

BRIEF DESCRIPTION OF THE FIGURES

FIG. 4 is a flow chart illustrating an embodiment of a method for providing a payment authorization;

FIG. 6 illustrates a schematic diagram of an embodiment of the method of FIG. 4;

Figure 1:
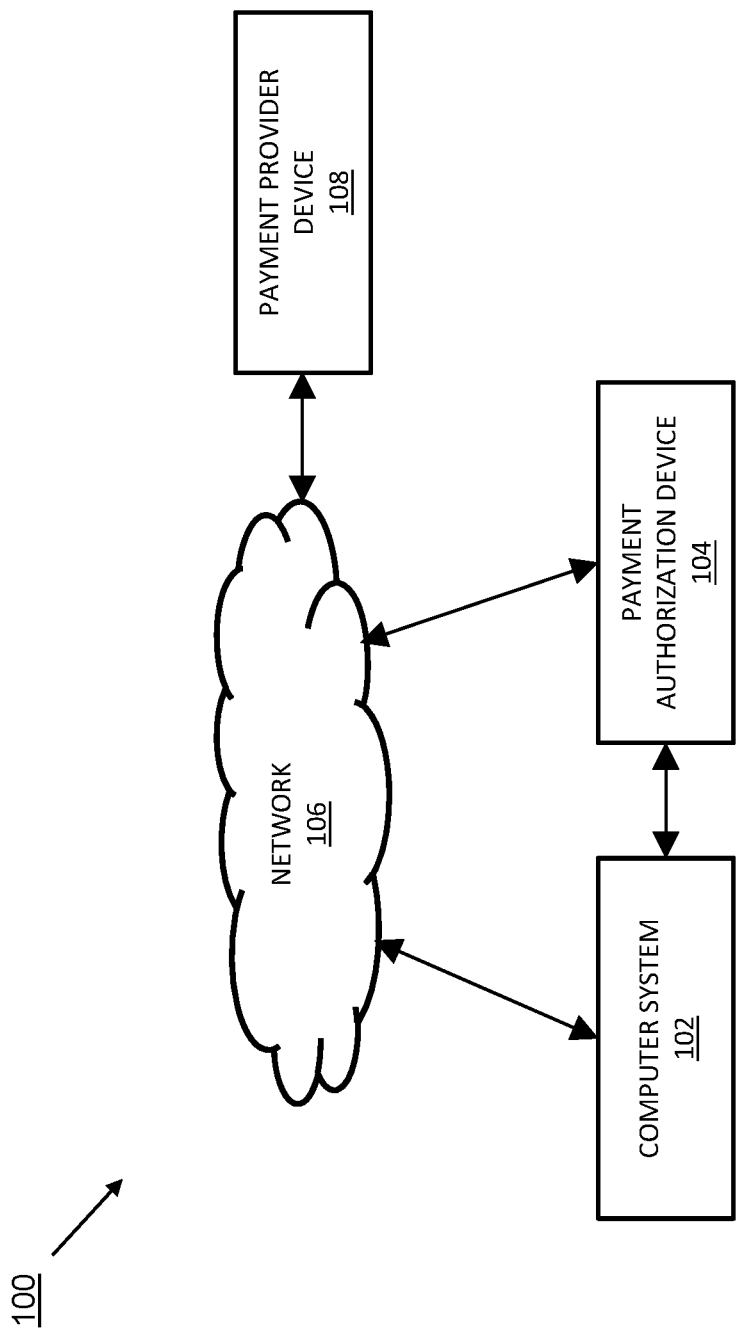
FIG. 1 is a schematic view illustrating an embodiment of a payment authorization system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides payment authorization systems and methods that provide customers with a convenient, secure, and reliable way to avoid online fraud and confidently conduct online purchase transactions. For example, systems and methods are disclosed herein which provide for authentication of a merchant virtual storefront (i.e., a merchant website) by a trusted payment authorization device (PAD) that may be separate from but co-located with the user device upon which the purchase transaction was initiated. The PAD, as described below, may further be configured to perform a plurality of additional functions such as securely storing a user's payment information, providing the user's payment information to an authenticated merchant website, notifying the user of the authenticity of a merchant website, interfacing with a payment service provider (e.g., PayPal, Inc. of San Jose, Calif.), and generally serving as a trusted and secure intermediary between a merchant website and a user device (e.g., a personal computer), in some embodiments with the participation of the payment service provider. While several examples of the PAD functionality are provided herein, those skilled in the art in possession of the present disclosure will recognize other possible PAD functions that will remain within the scope of the present disclosure.

Conventionally, customers going through a checkout process (i.e., itemization and collection of an amount due for purchases) at a virtual point of sale (i.e., a merchant website)

are prompted to enter billing information such as a credit card number, expiration date, security code, billing address, or other identifying information in association with an online purchase transaction. For certain groups such as children, some elderly individuals, or others not experienced or knowledgeable about online payments or other Internet transactions, providing such information may at best be an uncomfortable experience that is typically avoided and at worst, such individuals may become unsuspecting victims of online fraud. As used herein, the term "online fraud" may include hacking, phishing, spoofing, identity theft, or other forms of online fraud as known in the art. For purposes of this disclosure and clarity of discussion, various embodiments may be discussed with respect to phishing or spoofing; however, it is understood that the present embodiments are not limited to such examples. As used herein, "phishing" is used to describe an attempt to defraud an individual by stealing personal information (e.g., financial information), often by posing as a legitimate merchant and/or a legitimate entity. Thus, phishing is often perpetrated by way of website "spoofing", which is a term used to described a technique by which a fraudulent website is used to intentionally mislead a user into believing that the fraudulent website is actually a trusted, legitimate website. In some examples, website spoofing may be accomplished by the use of a cloaked uniform resource locator (URL), which may be used to conceal the URL of the fraudulent website. Irrespective of the manner by which online fraud is manifest, it is a threat which requires vigilance by those engaging in online activities and including online shopping. Additionally, while individuals may sometimes be aware of online fraud, they may not know how to identify or deal with the fraud. Thus, some individuals may avoid conducting online transactions that require any personal user information altogether, or they may spend an inordinate amount of time researching a website, a payment service provider, a merchant, etc. before making an online purchase.

Currently available anti-phishing software, which does not specifically provide protection for a user's sensitive financial information, is typically installed directly onto a user's device (e.g., a PC). It has been found that the user of anti-phishing software on the user device upon which purchase transactions are conducted, particularly with regard to users that are not savvy with regard to online purchases, typically fails to reassure the user that a purchase transaction is safe. In other words, users that are worried about whether a merchant website accessed through their user device has been compromised will typically have similar worries about whether the anti-phishing software on their user device has been compromised as well. Moreover, such anti-phishing and similar software is continuously in need of updating as new updates, patches, etc. are pushed out to user devices. In addition, regardless of whether or not such anti-phishing software is used, users are currently still required to enter their financial information (e.g., credit card number, expiration date, security code, billing address, etc.) using their user devices into a merchant website in order to complete a purchase transaction, which continues to leave the user vulnerable to attack. As a more secure alternative, and in accordance with various embodiments described herein, a payment authorization system may include an independent payment authorization device (PAD) that is separate from but co-located with their user device, and that serves as a trusted and secure intermediary for the user between a merchant website and their user device (PC), in some embodiments with the participation of the payment service provider. The PAD functionality, as described with respect to the embodiments discussed below, may also remove the need for a user to enter financial information into a merchant website through their user device in order to complete a purchase transaction. In some examples, the PAD may confirm the authenticity of a merchant virtual storefront (i.e., merchant website) to a user, and the user may enter and/or confirm previously entered financial information through the PAD at a time of purchase. The PAD, in communication with a payment service provider and/or the merchant website, may then complete a purchase transaction (or at least a payment portion of the transaction) upon authentication of the merchant website and authorization by the user. Thus, the PAD may operate to serve as an trusted and secure intermediary for the user that establishes confidence for a given purchase transaction by providing users with a convenient, secure, and reliable way to avoid online fraud and confidently conduct online purchases with a merchant website accessed through their user device.

Referring now to FIG. 1, an embodiment of a payment authorization system 100 is illustrated. The payment authorization system 100 includes a computer system 102. In some embodiments, the computer system 102 includes a desktop computer, a laptop computer, a mobile computing device and/or other type of computing device. While the embodiments herein are shown and described with reference to a single computer system 102 for the sake of clarity, it will be understood that various embodiments may include a plurality of computing devices. In various examples, the computer system 102 includes one or more computing devices that are coupled to a network 106 that is further coupled to a payment provider device 108, where the payment provider device 108 may likewise couple to the network 106 via a wired or wireless connection. In some embodiments, the computer system 102 and the payment provider device 108 are configured to communicate with one another by way of the network 106, for example by way of network communication devices, as discussed below. As shown in FIG. 1, the payment authorization system 100 also includes a payment authorization device (PAD) 104. In some embodiments, the PAD 104 includes an application specific computing device that is separate from but co-located with the computer system 102, provides the functionality described below, and may include a smart phone, a wearable computing device, a laptop computer, a mobile computing device, and/or other types of computing devices known in the art. However, in some embodiments, the PAD 104 may be integrated into the computer system in a manner that provides trust to a user such as, for example, by providing a separate display device, or a display section on a display device of the computer system 102, that is used for the authorization operations discussed below.

In some embodiments, for example when the PAD 104 includes a smart phone, tablet, or other mobile device, at least some of the functionality of the PAD 104 described herein may be accomplished by way of a mobile application (mobile app) executing on the mobile device. While the embodiments herein are shown and described with reference to a single PAD 104 for the sake of clarity, it will be understood that various embodiments may include a plurality of PADs. In various examples, the PAD 104 includes one or more devices that are coupled to the network 106. In some examples, the PAD 104 and the payment provider device 108 are configured to communicate with one another by way of the network 106, for example by way of the network communication devices, as discussed below.

The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the computer system 102 may communicate through the network 106 via cellular communication, by way of one or more network communication devices. In other examples, the computer system 102 may communicate through the network 106 via wireless communication (e.g., via a WiFi network), by way of one or more network communication devices. In yet other examples, the computer system 102 may communicate through the network 106 via any of a plurality of other radio and/or telecommunications protocols, by way of one or more network communication devices. In a similar manner, and in some examples, the PAD 104 may communicate through the network 106 via cellular communication, by way of one or more network communication devices. Also, the PAD 104 may communicate through the network 106 via wireless communication (e.g., via a WiFi network), by way of one or more network communication devices. In other examples, the PAD 104 may communicate through the network 106 via any of a plurality of other radio and/or telecommunications protocols, by way of one or more network communication devices. Furthermore, in various embodiments, the computer system 102 and the PAD 104 may communicate with each other via the network 106, for example using at least one of the communication methods described above, or by way of one or more beacon devices, as discussed below. In at least one example, the computer system 102 and the PAD 104 may communicate with each other via the one or more beacon devices, utilizing their respective network communication devices (described above) to communicate through the one or more beacon devices.

As described in more detail below with reference to FIG. 14, the payment authorization device (PAD) 104 may include a payment authorization engine, a communication engine, and one or more databases. Software or instructions stored on a computer-readable medium, and executed by one or more processors of the PAD 104, allows the PAD 104 to send and receive information over the network 106. Furthermore, the payment authorization engine in the PAD 104 may be configured to implement the various embodiments of the payment authorization system 100 as described herein. In some examples, the PAD 104 is configured to confirm the authenticity of a merchant website to a user, and complete at least a payment portion of a purchase transaction for a user. More generally, and as described in more detail below, the PAD 104 is configured to serve as an intermediary between a merchant website and the computer system 102, in some embodiments with the participation of the payment provider device 108, thereby establishing trust for a given purchase transaction and providing users with a secure, reliable way to avoid online fraud and conduct online purchases.

By way of example, and with reference to the payment authorization system 100 of FIG. 1, a customer may shop online, via a merchant website, using the computer system 102. Customer purchase transactions may be completed as described herein by communication from the computer system 102 to one or both of the PAD 104, acting as a website authentication and secure payment intermediary, and the payment provider device 108. In some embodiments, the payment provider device 108 may provide services and/or other functionality as offered by a payment service provider such as, for example, PayPal Inc. of San Jose, Calif. In some embodiments, the payment service provider processes payment requests from the computer system 102 (which have been authorized by the PAD 104), processes payment requests directly from the PAD 104, and processes payments from customers to merchants. In some examples, the payment service provider may use the payment provider device 108 to transfer funds from a customer payment account (e.g., provided by an account provider through an account provider device, provided by the payment service provider through the payment service provider device, etc.) of the customer to a merchant payment account (e.g., provided by an account provider through an account provider device, provided by the payment service provider through the payment service provider device, etc.) of the merchant (e.g., the merchant operating the merchant website at which the customer is shopping) to provide payment from the customer to the merchant during a payment transaction, which has been authorized by the PAD 104.

Figure 2:
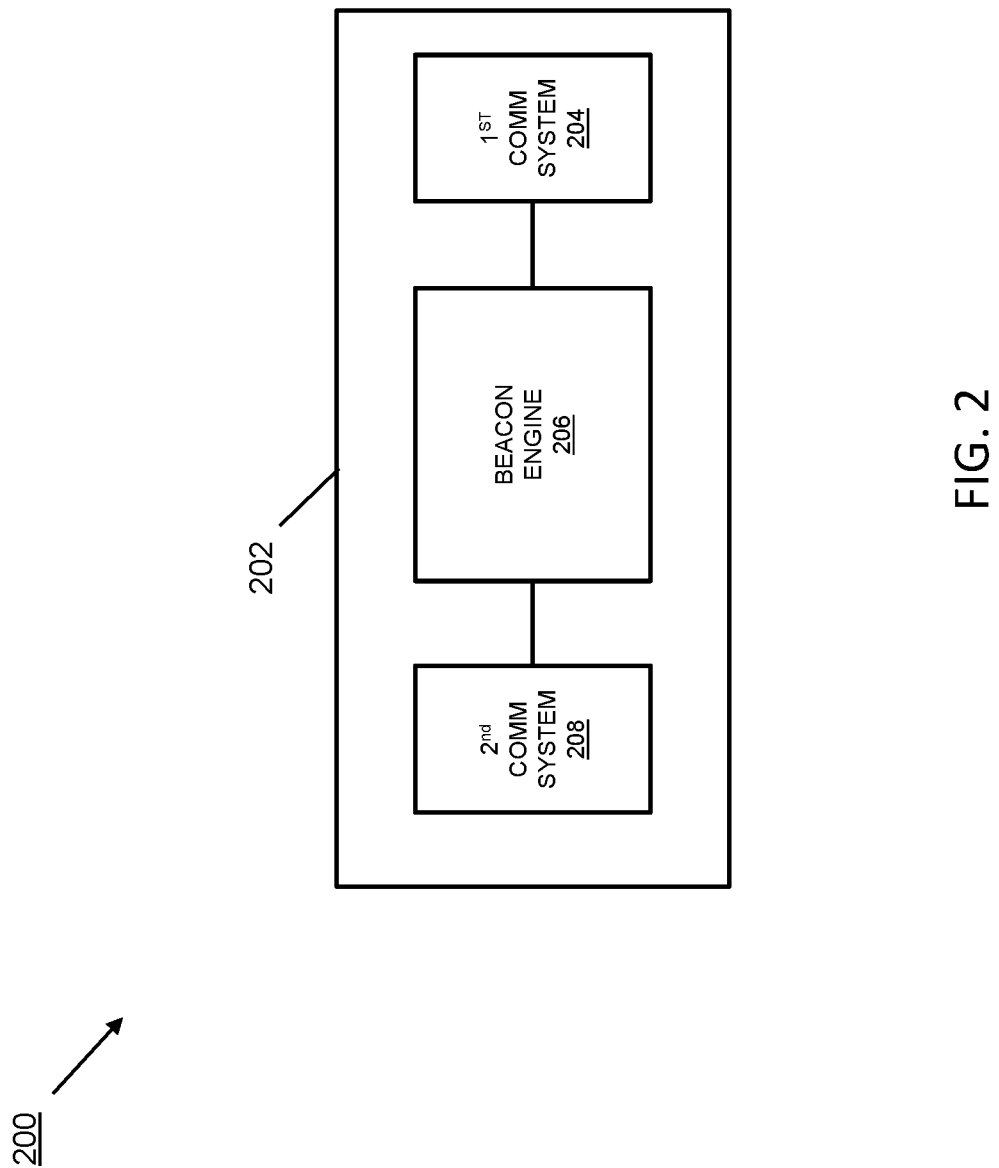
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a WiFi communications system, a cellular communication system, and/or a variety of other communication systems known in the art. The first communications system 204 is coupled to a beacon engine 206 that may be provided by instruction on a memory system (not illustrated) in the beacon device 200 that, when executed by a processing system (not illustrated) in the beacon device 200, causes the processing system to perform the functions of the beacon device 200 discussed below. The beacon engine 206 is coupled to a second communication system 208 such as, for example, a Bluetooth® Low Energy (BLE) communication system, a BLE direct communication system, a Near Field Communication (NFC) system, and/or a variety of other communication systems known in the art. The beacon engine 206 may be configured to receive any of a variety of sensor signals through the second communication system 208 and transmit those sensor signals using the first communication system 204. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. As such, the chassis 202 of the beacon device 200 may include any of a variety of features that allow for the coupling of the beacon device to, or placing it in close proximity to, either of the computer system 102 or the PAD 104, for example as shown in a payment authorization system 300 of FIGS. 3A and 3B, discussed below.

Figure 3A:
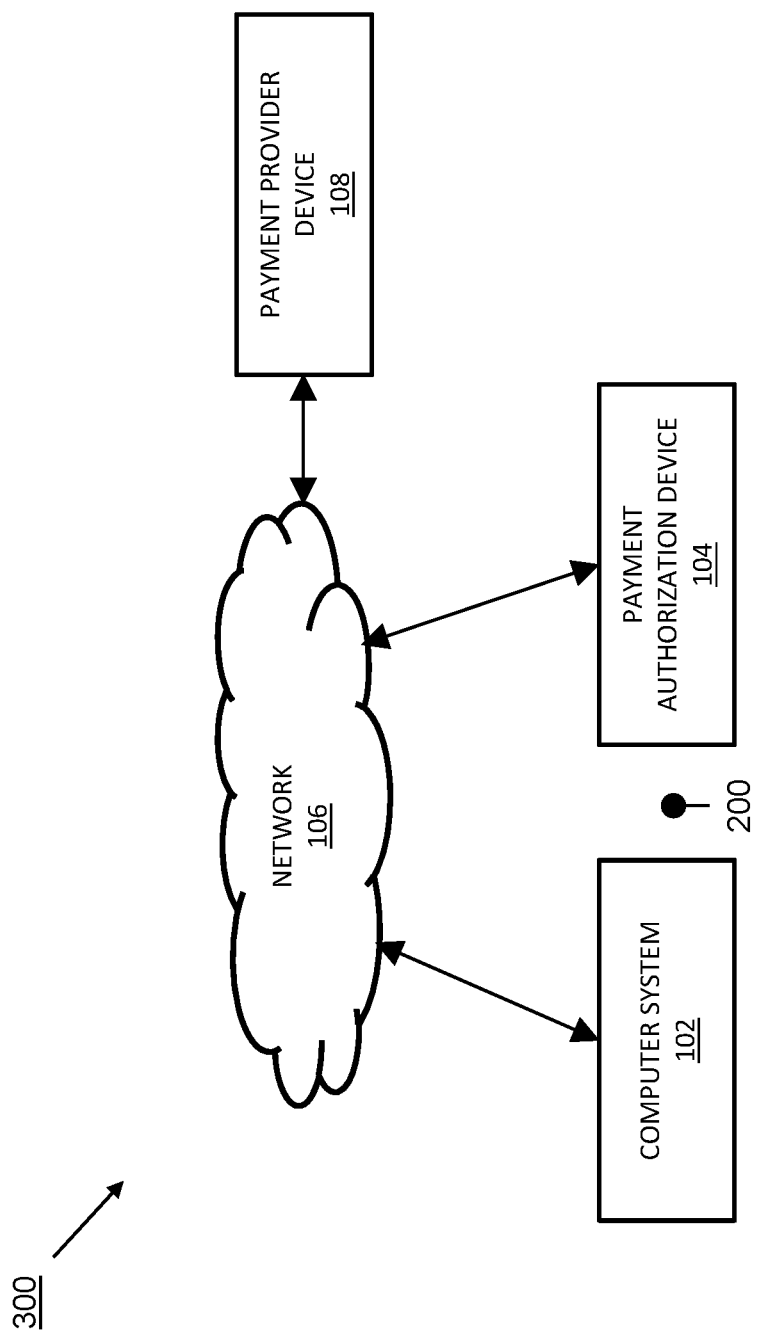
FIG. 3A is a schematic view illustrating an embodiment of the payment authorization system of FIG. 1 that includes the beacon device of FIG. 2.

For example, referring to the embodiment of the payment authorization system 300 shown in FIG. 3A, the payment authorization system 300 may be provided by positioning a beacon device 200, discussed above with reference to FIG. 2, proximate to the computer system 102 and the PAD 104. While only one beacon device 200 is illustrated, it will be understood that a plurality of beacon devices may also be used while remaining within the scope of the present disclosure. The beacon device 200 of the payment authorization system 300 may be configured to wirelessly communicate, via its first communications system 204, with a network communication device integrated within one of the computer system 102 or the PAD 104 such as, for example, a wireless network adapter or other networking device connected to a network such as the Internet. In some examples, both of the computer system 108 and the PAD 104 may include such a wireless network adapter or other networking device capable of communicating with the first communications system 204 of the beacon device 200.

Figure 3B:
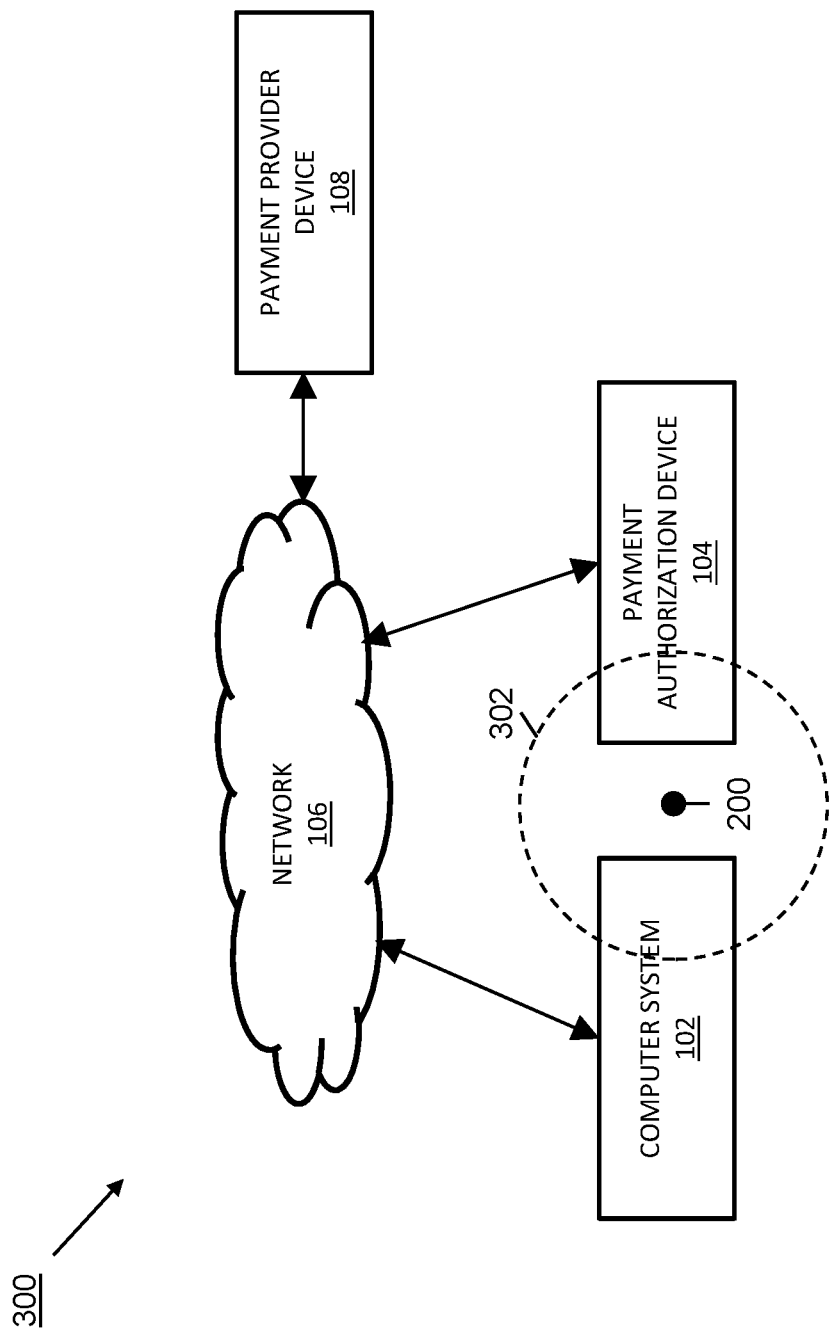
FIG. 3B is a schematic view illustrating an embodiment of the payment authorization system of FIG. 3A with the beacon device providing a communication area.

Referring now to FIG. 3B, in operation, the beacon device 200 is configured to create a communication area 302 with its second communications system 208. For example, the second communications system 208 in each beacon device 200 may be a BLE communications device that provides an approximately 100 foot radius communications area. Depending on a desired coverage area, the power of the beacon device 200 may be turned up or down to cover different sized areas. However, other communications systems providing other communications areas are envisioned as falling within the scope of the present disclosure. In embodiments including a plurality of beacon devices 200, the beacon devices 200 may be positioned in and around a particular physical location (e.g., a customer location, a merchant location, etc.) such that a plurality of communication areas 302 abut, overlap, or otherwise provide coverage for any area of interest within and around the particular physical location. One of skill in the art in possession of the present disclosure will appreciate that different configurations of the beacon devices 200 may be selected to cover any area of interest within and around a particular physical location with a communications area 302.

In some embodiments, for example when the beacon device 200 communicates with one of the computer system 102 or the PAD 104 (e.g., via its first communications system 204), the beacon device 200 may further communicate with the other one of the computer system 102 or the PAD 104 within its respective communication area 302 (e.g., using the second communication system 208). In other embodiments, the beacon device 200 may be configured to communicate with each of the computer system 102 and the PAD 104 via its first communications system 204. In yet other embodiments, the beacon device 200 may be configured to communicate with each of the computer system 102 and the PAD 104 via its second communications system 208. The beacon device 200, by way of one or more of the communication methods described above, may collect information from either of the computer system 102 and/or the PAD 104 and then send that information to various components of the payment authorization system 300 (e.g., using the first communication system 204) such that the collected information may be used to provide the functionality of the payment authorization system 300, as discussed below. In an embodiment, the beacon device 200 may communicate with one or more databases, for example including local and/or remote databases (as shown in FIG. 14) to retrieve merchant and/or customer information such as information related to merchant websites, payment account information, merchant account information, or other information as discussed below.

In some of the figures associated with the embodiments discussed below, the beacon device 200 and its communications area 302 is not shown for the sake of clarity, but it should be understood that the communications and retrieval of information from beacon communication devices, and the provision of that information to one or more components of the payment authorization system (e.g., the PAD 104), may be accomplished using beacon devices providing communications areas such as the beacon device 200 and communications area 302 illustrated in FIGS. 3A and 3B. While a specific example of a payment authorization system 300 is provided, one of skill in the art in possession of the present disclosure will recognize that a wide variety of different configurations of the payment authorization system 300, incorporating one or more beacon devices 200, may be implemented while remaining within the scope of the present disclosure.

In the embodiments discussed below, the payment authorization systems and methods involve using the payment authorization device (PAD) 104 to detect events associated with a virtual point of sale transaction such as events related to a checkout process on a merchant website. In some embodiments, this detection by the PAD 104 may be accomplished by communicating (e.g., through the beacon device 200 or other network communications device) with the computer system 102 and/or the payment provider device 108. In some embodiments, events associated with a checkout process on a merchant website may include adding an item for purchase to a virtual "cart", proceeding to a "checkout" portion of a merchant online payment interface, or other online purchasing events as known in the art.

In some embodiments, the computer system 102 includes instructions (i.e., software) stored on a memory device, that when executed by a processor of the computer system 102, cause the computer system 102 to provide a graphical user interface (i.e., a web browser) for displaying web pages and which can be used to navigate the Internet. In some embodiments, the computer system may further include instructions (e.g., plug-in software instructions) stored on the memory device which, when executed by the processor of the computer system 102 and in conjunction with execution of the web browser, cause the computer system 102 to provide one or more additional features, add-ons, or extensions to the web browser. In one example, in response to detection of an event associated with a checkout process on a merchant website, a web browser plug-in in the computer system 102 may communicate a message to the PAD 104 and/or the payment provider device 108, to perform the functionality of the payment authorization system as described below.

As one example, after detection of an event associated with a checkout process, the PAD 104 may confirm the authenticity of the merchant website at which a user is shopping. For example, the PAD may have access to a database (e.g., located on the PAD, accessible by the PAD over a network, for example, through the payment service provide device, etc.) that includes authentication information about verified, authorized, or otherwise trusted merchant websites, and the PAD may retrieve identifying information about the merchant website at which the user is shopping and compare that identifying information to the authentication information in the database to determine whether the merchant website is authentic. In other embodiments the payment service provider may receive the identifying information from the PAD and perform the authentication of the merchant website. In some embodiments, authentication of a merchant website may include communicating (e.g., by the PAD, by the payment provider, etc.) with a merchant that is purported to provide the merchant website at which a user is shopping in order to confirm that the merchant website is authentic.

Figure 7B:
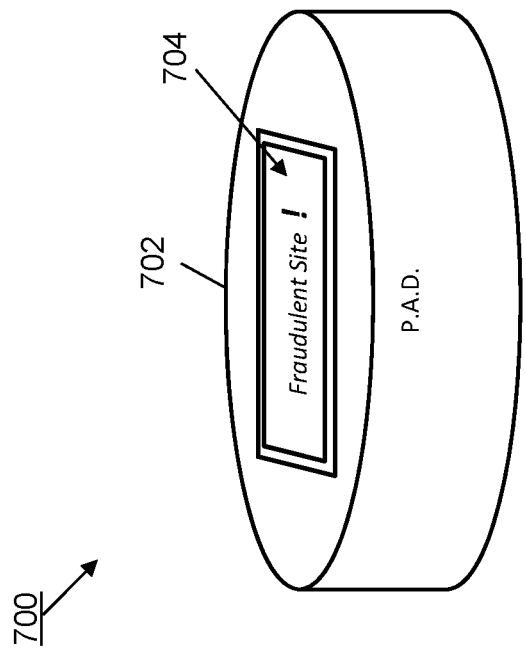
FIGS. 7A and 7B illustrate embodiments of a payment authorization device for use in the payment authorization system of FIG. 1.
Figure 7A:
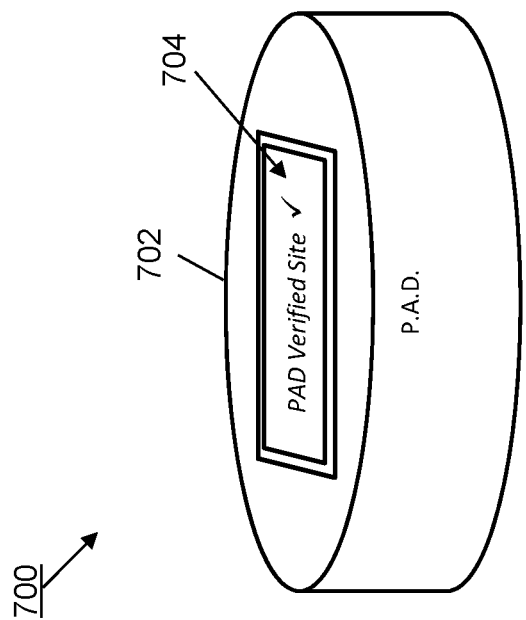
Figure 8:
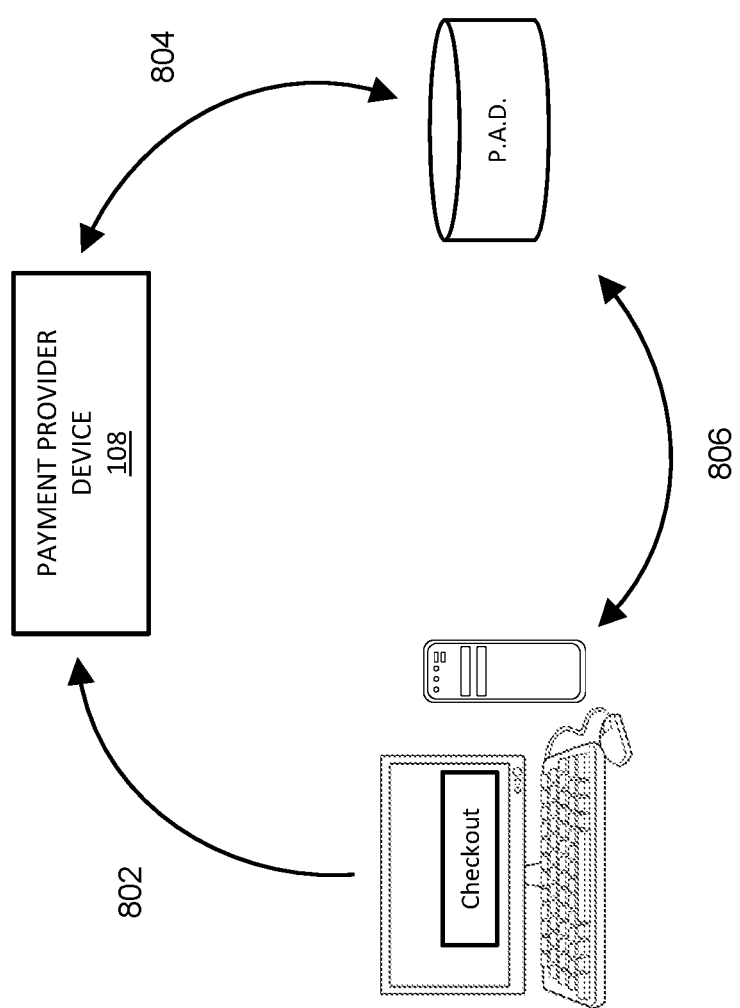
FIG. 8 illustrates a schematic diagram of another embodiment of the method of FIG. 4.
Figure 9:
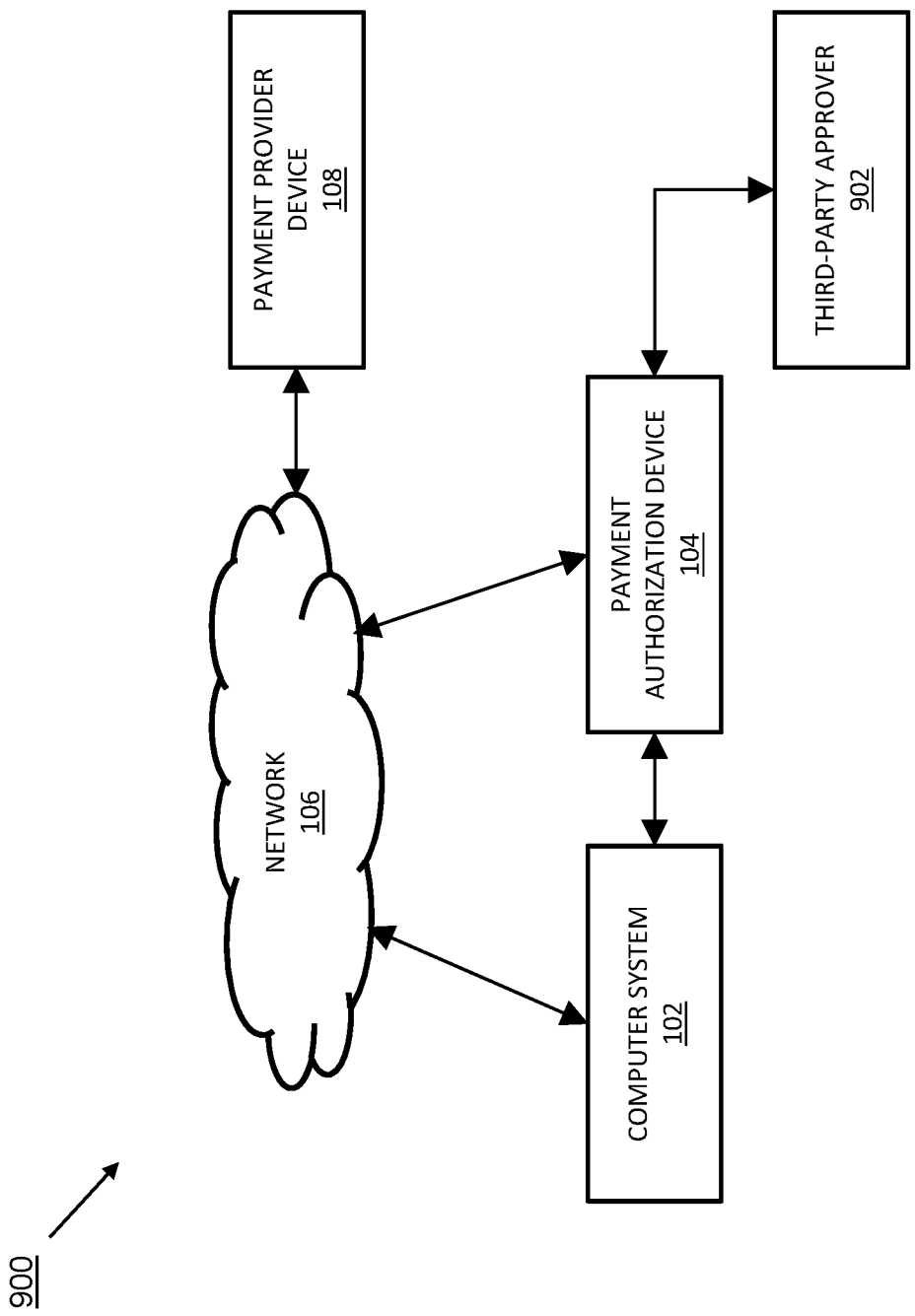
FIG. 9 is a schematic view illustrating an embodiment of a payment authorization system including a third-party approver.

The PAD 104 may then notify the user of the authenticity of the merchant website, for example via a display screen on the PAD as shown in FIGS. 7A and 7B. In some examples, the PAD 104 may include an input interface (e.g., a keypad, a touchscreen, etc.)

such that after the PAD 104 has confirmed the authenticity of the merchant website, the user may elect to enter payment information via the PAD 104 input interface, confirm previously entered financial information, or simply confirm a purchase. The PAD 104, in communication with a payment service provider and/or the merchant website, may then facilitate the completion of a purchase transaction (or at least a payment portion of the transaction). Thus, a user may have the authenticity of the merchant website confirmed on a display or display section that the user does not associate with the merchant website, and the user may not be required to enter any sensitive financial information directly on the merchant website through their user device, as in such embodiments the PAD 104 serves as a trusted and secure payment intermediary. This provides purchasing trust to users, while protecting them from online fraud, and increases customer traffic to merchant websites by removing obstacles and/or fears for those individuals not comfortable with or knowledgeable about online payments. While it has been found that the use of a separate hardware device to provide the PAD 104 may be reassuring to many users in conducting online payment transactions, it is also envisioned that appropriate graphic user interfaces displayed on the user device will allow the PAD 104 to be integrated into the user device while providing similar online payment transaction reassurance.

In some embodiments, the PAD 104 (e.g., in communication with the payment provider device 108) may also operate to retrieve information related to a customer payment account provided by the payment provider and stored in the payment provider device such as a credit card number, credit card expiration date, payment security code, payment billing address, or other information related to the customer payment account. In the various embodiments discussed herein, such sensitive financial information may only be delivered by the PAD 104 to the merchant and/or merchant website after the PAD 104 has confirmed the authenticity of the merchant website, as described above. In some embodiments, the PAD 104 may also store (or retrieve as needed from the payment provider device 108) other customer and/or merchant information (e.g., customer payment account information as described above, customer preferences, customer device information, customer purchase histories, merchant account information, etc.) in a database located within the PAD 104 (as shown in FIG. 14), or at a remote database (also shown in FIG. 14), for example, by way of a network connection.

Referring now to FIG. 4, an embodiment of a method 400 for providing a payment authorization system that provides customers with a trusted, convenient, secure, and reliable way to avoid online fraud and confidently conduct online purchase transactions is illustrated. One of skill in the art in possession of the present disclosure will recognize that the method 400 may be performed for a plurality of different users, using different computer systems, and utilizing the same PAD (e.g., for users at the same physical location) or different PADs (e.g., for users at different physical locations). The method 400 begins at block 402 where a request to authenticate a merchant virtual storefront (i.e., a merchant website) is received. As discussed in more detail below, the request to authenticate the merchant website may be performed in response to an event related to a merchant website transaction or merchant website transaction request (e.g., adding an item to a virtual cart, proceeding to a checkout portion of the website, attempting to pay for an item, etc.). In particular, with reference to FIGS. 5-9, various examples of the method 400 are illustrated and described.

Figure 5:
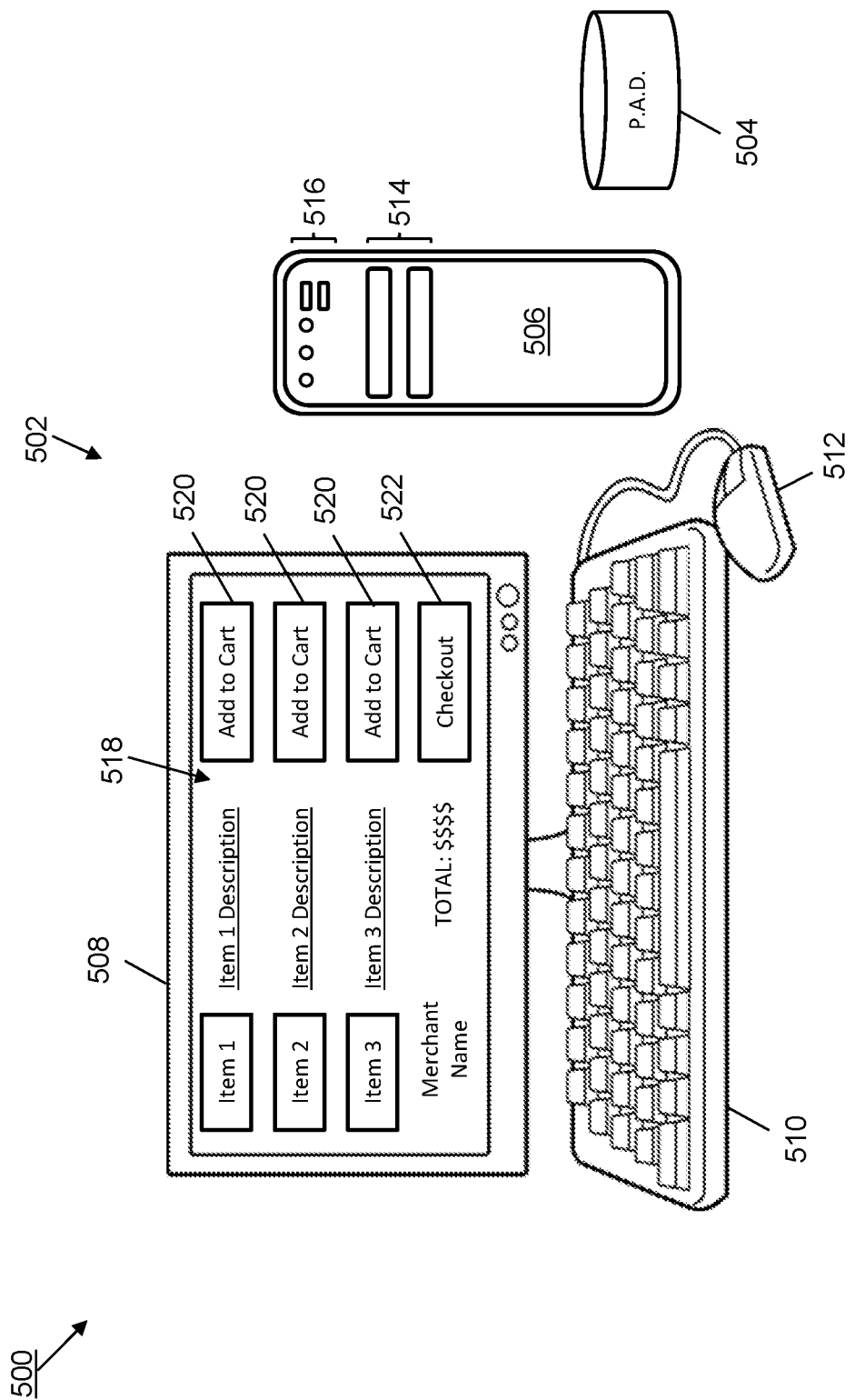
FIG. 5 illustrates an embodiment of the payment authorization system of FIG. 1 including a user device displaying a merchant virtual storefront.

Referring first to FIG. 5, an embodiment of a payment authorization system 500 including a user device 502 and a payment authorization device (PAD) 504 is illustrated. In some embodiments, the user device 502 includes a desktop computer having a tower 506, a monitor 508, a keyboard 510, and a mouse 512. The tower 506 may include one or more disk drives 514, one or more input/output (I/O) ports 516, as well as a plurality of other components for example as shown in the computer system of FIG. 13. While the user device 502 is illustrated as a desktop computer, it will be understood that the user device 502 may equally include a laptop computer, a tablet, or other computing device as known in the art while remaining within the scope of the present disclosure. As shown, the monitor 508 includes a display 518 which in the example of FIG. 5 displays a portion of a merchant virtual storefront (i.e., a merchant website). The merchant website may include a plurality of items available for purchase, descriptions of the items, as well as options to add items to a customer virtual cart (e.g., via buttons 520) and checkout (e.g., via button 522). FIG. 5 illustrates an embodiment of the payment authorization system 500 where the PAD 504 is separate from but co-located with the user device 502 that is accessing the virtual merchant storefront, but as discussed above, some embodiments may allow the PAD 504 to be integrated into the user device 502 (e.g., as part of the tower 506, the monitor 508, the keyboard 510, etc.).

By way of example of block 402, and with reference to FIG. 6, a customer may be shopping on the merchant website via the user device 502 and using a web browser having a plug-in installed for the detection of events associated with a checkout process. As indicated by arrow 602, a request may be sent by the user device 502 to the PAD 504 to authenticate the merchant virtual storefront based on the detected event. Alternatively, and in some embodiments, the PAD 504, in communication with the user device 502, may actively detect events (e.g., as also indicated by arrow 602) associated with the checkout process and thus initiate authentication of the merchant virtual storefront without explicit instruction from a user (e.g., a user may simply shop the merchant virtual storefront conventionally while the PAD performs the method 400 in the background). Although some examples of detection of events related to a merchant website transaction request have been discussed, other methods of detection of such events which will result in requests to the PAD 504 for authentication of the merchant virtual storefront will fall within the scope of the present disclosure. By way of example, events related to the merchant website transaction request that may initiate a PAD 504 website authentication request may include a customer browsing the merchant website, adding one or more items to a virtual cart (e.g., via buttons 520), proceeding to a checkout portion of the website (e.g., via button 522), attempting to pay for an item, and/or other merchant website events as known in the art.

Thus, following block 402, the PAD 504 may have received one or more requests to authenticate a merchant virtual storefront (i.e. a merchant website). The one or more authentication requests may be based on a merchant virtual storefront transaction request, as described above. In some examples, the authentication request may be sent by the user device 502 to the PAD 504. In other examples, the PAD 504 may actively detect merchant virtual storefront transaction requests occurring on the user device 502 and independently initiate merchant website authentication.

The method 400 proceeds to block 404 where identifying information associated with the merchant virtual storefront is retrieved. In some examples, such identifying information may include markup language such as a hypertext markup language (HTML), metadata, secure sockets layer (SSL) data, an IP address, a website URL, DNS data, TCP/IP data, webpage screenshots, and/or other website identifying information as known in the art. In some embodiments, the identifying information may be sent to the PAD 504 by the user device 502, separately from or in conjunction with, the authentication request sent at block 402 and illustrated via arrow 602. In some embodiments, the identifying information may be independently retrieved by the PAD 504 in communication with the user device 502, separately from or in conjunction with, detection of a merchant virtual storefront transaction request by the PAD 504 and the associated merchant website authentication. Thus, following block 404, the PAD 504 may have retrieved from and/or received from the user device 502 any identifying information that may be used to confirm an authenticity of a merchant website.

The method 400 then proceeds to block 406 where an authenticity of the merchant virtual storefront (e.g., a merchant website) is determined using the payment authorization device. In some embodiments, the authenticity of the merchant website is determined using the identifying information retrieved at block 404; however other methods may also be used. In one example, the PAD 504 may store in memory, such as a local database shown in FIG. 14, authentication information for merchant websites that may include a whitelist and/or blacklist containing a list of recognized, approved, and legitimate websites and/or a list of unapproved or fraudulent websites. In some embodiments, the PAD 504 may compare the identifying information retrieved at block 404 to such authentication information and thus determine an authenticity of a merchant website. In a similar but different example, the PAD 504 may retrieve authentication information from a remote database (shown in FIG. 14), and which for example may be located at the payment provider device 108. In such examples, the PAD 504 may request the authentication information from the payment provider device 108, as illustrated by arrow 604, and the payment provider device 108 may then provide the requested authentication information to the PAD 504, as illustrated by arrow 606. The PAD 504 may then compare the identifying information retrieved at block 404 to the authentication information provided by the payment provider device 108 and thus determine an authenticity of a merchant website. As used herein, the authentication information may be equivalently referred to as "baseline identifying information," as such data is used herein as a basis for comparison against the identifying information retrieved at block 404. In some embodiments, other types of baseline identifying information (e.g., HTML data, metadata, SSL data, an IP address, a website URL, DNS data, TCP/IP data, etc.) may be stored in a local database (i.e., a PAD database) or a remote database (e.g., a payment provider database) for comparison to the identifying information retrieved at block 404 and subsequent determination of the authenticity of a merchant website.

In other embodiments of block 404, the authenticity of a merchant website may be determined by other methods using of the identifying information retrieved at block 404 and a variety of other authentication information known in the art. For example, the PAD 504 may detect a phishing signature embedded within the identifying information, which identifies the merchant website as a fraudulent website. In another example, the PAD 504 may include a heuristic engine employing an algorithm configured to detect fraudulent websites and including detection of fraudulent data within the identifying information retrieved at block 404. In other examples, the PAD 504 may detect an SSL mismatch within the identifying information, which may identify the merchant website as a fraudulent website. In yet other examples, the PAD 504 may detect a cloaked URL within the identifying information, which may identify the merchant website as a fraudulent website. Many other methods, algorithms, or techniques may be used by the PAD 504, alone or in cooperation with the payment provider device 108, to authenticate a merchant website. For example, any of the actions discussed above as being performed by the PAD 504 may instead be performed by the payment provider device 108 after receiving the identifying information from the PAD 504 over the network.

Referring to FIG. 7A, an embodiment of a PAD 700 having a housing 702 and including a display 704 is illustrated. In some embodiments, the PAD 700 may include one or more computer system components within the housing 702, such as the components illustrated the computer system of FIG. 13. Thus, the PAD 700 is capable of storing data and instructions, executing instructions, and communicating with the computer system 102 and the payment provider device 108. In some embodiments, the PAD 700 may include a display 704 as illustrated, and an input device (not illustrated) that allows a user to provide information. Upon authentication of the merchant website, using any of the techniques described above, the PAD 104 may then notify the user about the determined authenticity of the merchant website via the display 704. In the example of FIG. 7A, the merchant website has been authenticated as a legitimate, trusted site, and the user may be notified with a message such as "PAD Verified Site ✓," which operates to let the user know that they may safely proceed with their purchase transaction. In the example of FIG. 7B, the merchant website has been determined to be a fraudulent, untrusted site, and the user may be notified with a message such as "Fraudulent Site!," which operates to let the user know that they should not proceed with their purchase transaction. It has been found that a stand-alone PAD device with the display 704 and a relatively simple input device (e.g., a confirmation button) may be provided to relatively un-savvy users in order to give them more confidence in authorizing online transactions with merchant websites. As such, the PAD 700 of FIGS. 7A and 7B may be purposely provided with limited functionality by way of few input options in order to reassure users unfamiliar or uncomfortable with providing information over the Internet (i.e., a user may be instructed that a transaction should only be confirmed via a "confirm" input button on the PAD 104 when a merchant website is verified on the display of the PAD 700).

Thus, following block 406, the PAD may have determined the authenticity of a website at which a user is shopping. For example, using information retrieved from the computer system 102, from the payment provider device 108, and/or information stored within the PAD, the PAD (operating alone or in conjunction with the payment provider device) can determine the authenticity of a merchant website using one or more of the methods, described above, and notify the user of the safety or danger or proceeding with a particular transaction.

Figure 10:
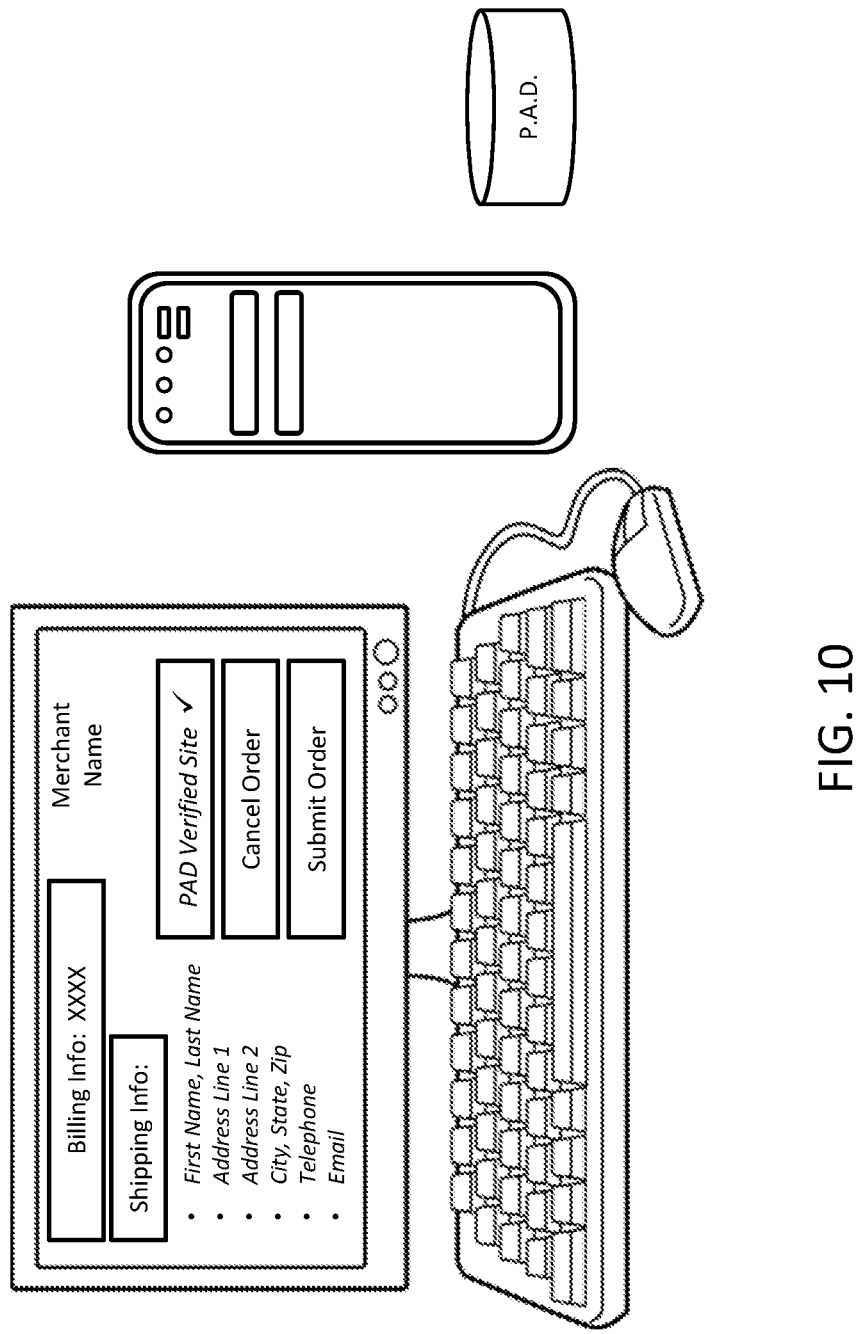
FIG. 10 illustrates an embodiment of the payment authorization system of FIG. 1 including a user device displaying a merchant virtual storefront after authorization by the payment authorization device of FIGS. 7A and 7B.

The method 400 then proceeds to block 408 where an event related to a merchant website transaction request (e.g., adding an item to a virtual cart, proceeding to a checkout portion of the website, attempting to pay for an item, etc.), which may have triggered the authentication request of the merchant website as described above, is authorized. For example, after the merchant website has been authenticated as a trusted site (FIG. 7A), the PAD 504 may operate to complete a payment portion of a website purchase transaction. In some cases, the user may enter financial information via an input device (e.g., a touchscreen interface) on the PAD 700, which may then be sent to the payment service provider to conduct a fund transfer with the merchant, or which may be sent from the PAD 504 to the computer system 102, as illustrated by arrow 608, in order to allow the computer system to automatically populate payment information fields on the merchant website. In some examples, after the PAD 504 has been used by the computer system 102 to populate payment fields on a merchant website, or has otherwise been used to transmit payment information securely to the payment provider device to conduct a fund transfer with the merchant, the user may then directly enter shipping information and/or other less sensitive information into the merchant website directly by way of the computer system 102, and as illustrated in FIG. 10. However, in some cases, the PAD 504 may also be configured to automatically transmit shipping information and/or other less sensitive information to the merchant and/or merchant website. In some examples, the user may confirm, for example via the PAD display 704 and/or input devices, previously entered financial information, shipping information, and/or other user information. In particular, the PAD 504, in communication with a payment service provider (e.g., via the payment provider device 108) and/or the merchant website (e.g., via the computer system 102), may complete at least a payment portion of a transaction upon authentication of the merchant website by the PAD 504 and upon authorization by the user. For example, in some embodiments, the PAD 504 may retrieve user payment account information from the payment provider device 108 and provide such information to the merchant website via the computer system 102 (e.g., via communication between an application running on the PAD 504 and the plug-in operating on the computer system). As such, the PAD 504 may operate such that the user never uses the computer system 102 to enter sensitive or personal user information into a merchant website, thus, assuring the user that such information will not be stolen by a compromised computer system 102.

In some examples, the user may provide final payment authorization via the PAD 504 on-the-fly (i.e., at the moment it is requested by the PAD 504), by using an input device on the PAD 504 (e.g., a confirmation button) to provide a confirmation after the PAD 504 has authenticated a given website. In other examples, the user may pre-authorize the PAD 504 to transmit payment information to the merchant website automatically upon authentication by the PAD 504 of a given website, in some examples based on a set of user preferences stored in the PAD 504. Some examples of such user preferences include a list of user-authorized merchant websites, an amount of a purchase transaction, a type of transaction, etc. For example, purchases below a user-defined value (e.g., $5, $10, etc.) at a particular user-authorized merchant website may be automatically approved for payment by the PAD 504 upon authentication of the merchant website by the PAD 504. In other examples, purchases for any dollar amount at a particular user-authorized merchant website (e.g., a pharmacy) that are part of a user-approved category (e.g., prescription drugs or other healthcare items) may also be automatically approved for payment by the PAD 504 upon authentication of the merchant website by the PAD 504. While the examples given above discuss authorization of a payment portion of a website purchase transaction upon authentication by the PAD 504 of the merchant website, some embodiments may include authorization of other types of merchant website transaction requests. For example, the method 400 may also be implemented to authorize adding an item to a virtual cart (e.g., upon detection by the PAD 504 that the user is on a merchant website), proceeding to a checkout portion of the website (e.g., upon detection by the PAD 504 that one or more items have been added to a virtual cart), and attempting to pay for an item, as described above.

Thus, following block 408, the PAD may have authorized one or more merchant website transaction requests. For example, after the PAD has determined the authenticity of a merchant website, as described above, the PAD may automatically, or by way of user authorization (user confirmation), complete at least a payment portion of a merchant website purchase transaction. However, other examples of block 408 include PAD authorization of other types of merchant website transaction requests, as described above.

While a particular method 400 for providing a payment authorization system has been described above, for example with reference to FIG. 6, those of skill in the art in possession of the present disclosure will recognize that the payment authorization system described herein may be implemented in a variety of other manners while remaining within the scope of the disclosure. For example, with reference to FIG. 8, a customer may be shopping on the merchant website via the user device 502 and using a web browser having a plug-in installed for the detection of events associated with a checkout process, as discussed above. In some examples, the web browser plug-in or other software executing on the computer system 102, may invoke a call to the payment provider device 108, as illustrated by arrow 802. The call to the payment provider device 108 may be invoked upon the detection of an event associated with a checkout process, and at least prior to entering of any sensitive financial information into a merchant website. The payment provider device 108 may retrieve identifying information associated with the merchant website and transmit such information to the PAD 504, as illustrated by arrow 804, for use in authenticating the merchant website. Alternatively, upon receiving the call from the computer system 102 (arrow 802), the payment provider device 108 may notify the PAD 504 (arrow 804), thus prompting the PAD 504 to initiate an authentication procedure for the merchant website, for example as illustrated by arrow 806. In some examples, when the payment provider device 108 notifies the PAD 504 that the user is trying to make a purchase via a particular merchant website, the PAD 504 may begin to retrieve identifying information from the merchant website (arrow 806), for use in determining the authenticity of the merchant website, as described above. After the PAD 504 has determined the authenticity of the merchant website, the PAD 504 may complete a payment portion of a website purchase transaction in response to a request from the computer system 102 as instructed by the user, as described above. In some cases, the user may enter financial information via a touchscreen interface of the PAD display or the user may confirm previously entered financial information via the PAD display. Also, in some cases, the PAD 504 may retrieve user payment account information from the payment provider device 108 (arrow 804) and provide such information to the merchant website via the computer system 102. In other embodiments, the PAD 504 may utilize user payment account information previously provided by the payment provider device 108 (arrow 804) and provide such information to the merchant website.

Additional method steps may be implemented before, during, and after the method 400, and some steps described above may be replaced or eliminated in accordance with various embodiments of the method 400. For example, with reference to FIG. 9, a payment authorization system 900 including a third-party approver 902, is illustrated. In some embodiments, the third-party approver 902 includes a computing device (e.g., a desktop, a laptop, a tablet, a mobile phone, or other computing device) operated for example, by an individual having authority over the customer payment account being used to complete a purchase transaction via the merchant website (e.g., a parent that allows their child or other dependent to use their payment account). By way of example, consider a child using the computer system 102 to play video games or read books. Moreover, consider the child attempting to purchase new video games, video game add-ons, books, comic books, etc., without prior parental consent. In some examples, when the child attempts to make such a purchase, the payment authorization system 900 may retrieve identifying information and determine an authenticity of the website that the child is browsing. However, prior to authorization of any purchase, the PAD 104 may communicate with the third-party approver 902 requesting approval for the child's purchase. If the third-party approver 902 grants the purchase request, such approval is transmitted to the PAD 104 and the purchase may be completed as described above (e.g., assuming the merchant website is determined to be authentic). In other examples, the third-party approver 902 may deny such a request. As such, a parent may be notified on their mobile phone by the PAD 104 when a child is attempting to make a purchase using the computer system 102, and may control whether that attempted purchase is conducted.

In addition, in some cases the third-party approver 902 may configure the PAD 104 according to a set of user preferences (e.g., user-authorized merchant websites, a cost of a purchase transaction, a type of transaction, etc.). For example, continuing with the above example, the third-party approver 902 may have defined a particular PAD 104 preference which allows the purchase of any children's books on EBay.com below $20, up to a maximum of $100 for a given month. Thus, purchase attempts by the child operating the computer system 102 which satisfy such a defined third-party approver 902 preferences (e.g., as stored and updated in a database) may be automatically approved for payment by the PAD 104, upon authentication of the merchant website by the PAD. While some examples related to the third-party approver 902 have been shown and described, other methods, systems, and embodiments for implementation of the third-party approver and its associated functionality will become apparent to those skilled in the art in possession of this disclosure, while remaining within its scope.

Thus, systems and methods have been described which provide an trusted, independent payment authorization system, in some cases separate from but co-located with a computer system used by a customer for online shopping, that may operate by itself or with the participation of a payment provider device to reassure a user that an online transaction is safe to conduct. For example, systems and methods are disclosed herein which provide for authentication of a merchant virtual storefront (i.e., a merchant website) by a payment authorization device (PAD). In addition, the PAD, as described herein, may also operate to provide sensitive user information such as the user's payment information to a merchant website after authentication of the merchant website by the PAD. Generally, the PAD may serve as a trusted and secure intermediary between a merchant website and a user device (e.g., a personal computer), in some embodiments with the participation of the payment service provider. Thus, the payment authorization system described herein provides users with a trusted, convenient, secure, and reliable way to avoid online fraud and confidently conduct online purchase transactions.

Figure 11:
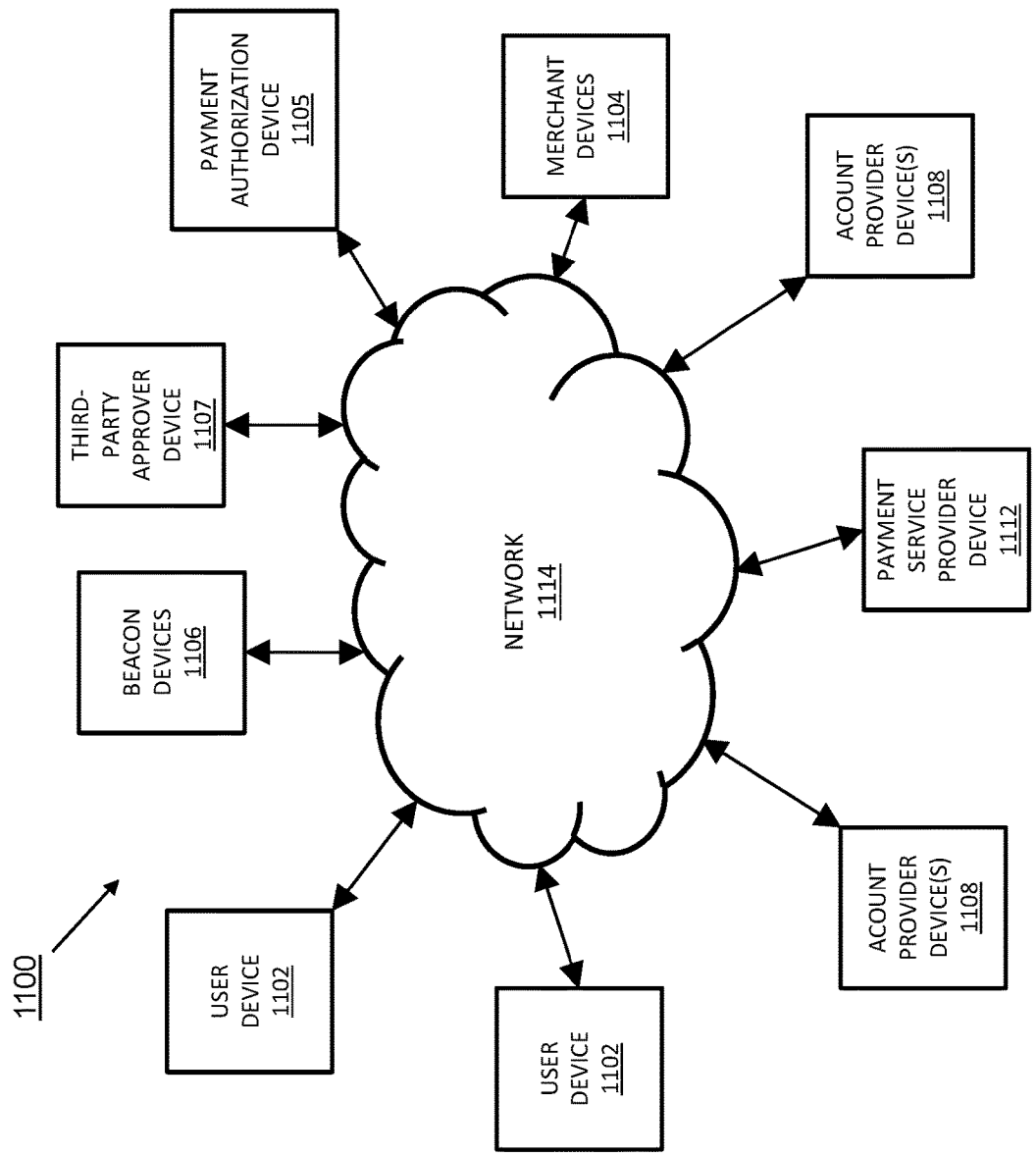
FIG. 11 is a schematic view illustrating an embodiment of a networked system.

Referring now to FIG. 11, an embodiment of a network-based system 1100 for implementing one or more processes described herein is illustrated. As shown, the network-based system 1100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 11 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1100 illustrated in FIG. 11 includes a plurality of user devices 1102, a plurality of merchant devices 1104, a plurality of beacon devices 1106, a payment service provider device 1112, a payment authorization device 1105, a third-party approver device 1107, and/or account provider device(s) 1108 in communication over one or more networks 1114. The user devices 1102 may be the user devices discussed above and may be operated by the users and/or customers discussed above. The beacon devices 1106 may be the merchant beacon devices discussed above. The merchant devices 1104 may include merchant devices providing merchant websites to the user devices 1102, for example via the Internet over the network 1114. The payment service provider device 1112 may be the payment service provider devices discussed above and may be operated by a payment service provider such as, for example, PayPal Inc. of San Jose, Calif. The account provider devices 1108 may be operated by credit card account providers, bank account providers, savings account providers, and a variety of other account providers known in the art. The payment authorization device 1105 may be the payment authorization devices discussed above. The third-party approver device 1107 may be the third-party approver device discussed above.

The user devices 1102, merchant devices 1104, beacon devices 1106, payment service provider device 1112, payment authorization device 1105, third-party approver device 1107, and/or account provider devices 1108 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1114.

The network 1114 may be implemented as a single network or a combination of multiple networks. For example, in various embodiments, the network 1114 may include the Internet and/or one or more intranets, landline networks, wireless networks, and/or other appropriate types of networks.

The user devices 1102 and third-party approver device 1107 may be implemented using any appropriate combination of hardware and/or software configured for wired and/or wireless communication over network 1114. For example, in one embodiment, the user devices 1102 and third-party approver device 1107 may be implemented as a personal computer of a user in communication with the Internet. In other embodiments, the user devices 1102 and third-party approver device 1107 may be a smart phone, wearable computing device, laptop computer, and/or other types of computing devices.

The user devices 1102 and third-party approver device 1107 may include one or more browser applications which may be used, for example, to provide a convenient interface to permit the user/customer and/or third-party approver to browse information available over the network 1114. For example, in one embodiment, the browser application may be implemented as a web browser configured to view information available over the Internet, such as merchant websites provided by the merchant devices 1104.

The user devices 1102 and third-party approver device 1107 may also include one or more toolbar applications which may be used, for example, to provide user-side processing for performing desired tasks in response to operations selected by the user and/or customer.

In one embodiment, the toolbar application may display a user interface in connection with the browser application.

The user devices 1102 and third-party approver device 1107 may further include other applications as may be desired in particular embodiments to provide desired features to the user devices 1102 and third-party approver device 1107. In particular, the other applications may include a payment application for payments assisted by a payment service provider through the payment service provider device 1112. The other applications may also include security applications for implementing user-side security features, programmatic user applications for interfacing with appropriate application programming interfaces (APIs) over the network 1114, or other types of applications. Email and/or text applications may also be included, which allow a customer payer to send and receive emails and/or text messages through the network 1114. The user devices 1102 and third-party approver device 1107 includes one or more user and/or device identifiers which may be implemented, for example, as operating system registry entries, cookies associated with the browser application, identifiers associated with hardware of the user devices 1102 and third-party approver device 1107, or other appropriate identifiers, such as a phone number. In one embodiment, the user identifier may be used by the payment service provider device 1112 and/or account provider device 1108 to associate the user with a particular account as further described herein.

The payment authorization device 1105 may be implemented using any appropriate combination of hardware and/or software configured for wired and/or wireless communication over network 1114. For example, in one embodiment, the payment authorization device 1105 may be implemented as a standalone hardware component capable of wired and/or wireless communication and communication over the Internet. In other embodiments, the payment authorization device 1105 may be a smart phone, wearable computing device, laptop computer, desktop computer and/or other types of computing devices.

The merchant devices 1104 may be maintained, for example, by a conventional or online merchant, conventional or digital goods seller, individual seller, and/or application developer offering various products and/or services in exchange for payment to be received conventionally or over the network 1114. In this regard, the merchant device 1104 may include a database identifying available products and/or services (e.g., collectively referred to as items) which may be made available for viewing (e.g., via a merchant website) and purchase by the customer.

The merchant devices 1104 also include a checkout application which may be configured to facilitate the purchase by the payer of items. The checkout application may be configured to accept payment information from the user through the user devices 1102, the account provider through the account provider device 1108, from the payment authorization device 1105, and/or from the payment service provider through the payment service provider device 1112 over the network 1114.

Figure 12:
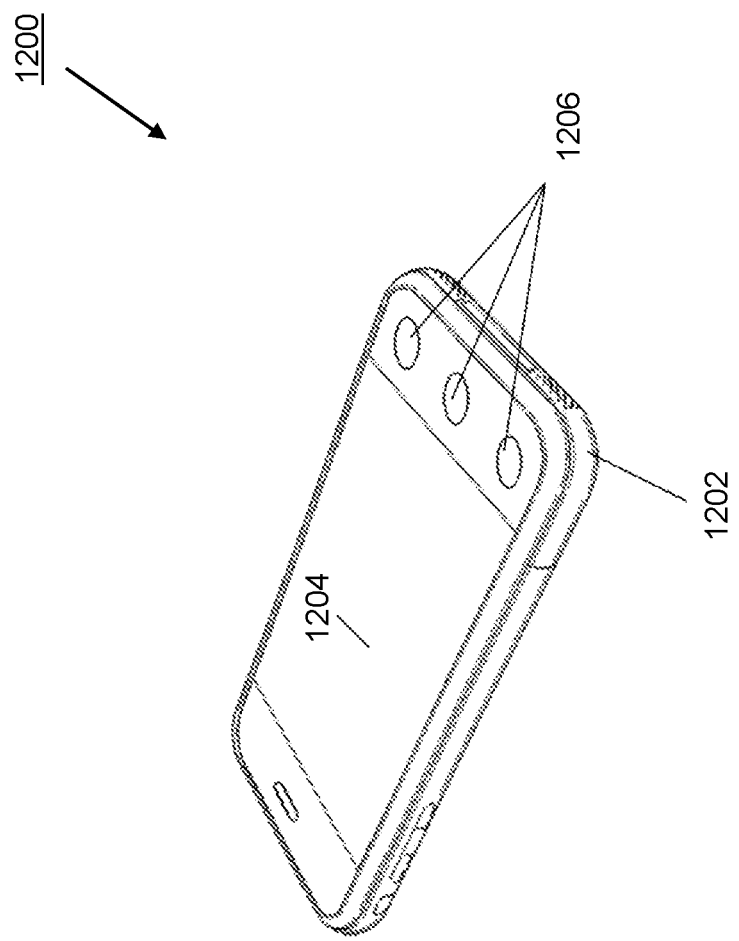
FIG. 12 is a perspective view illustrating an embodiment of a user device.

Referring now to FIG. 12, an embodiment of a user device 1200 is illustrated. The user device 1200 may be the user device 102, 502 (e.g., used instead of a desktop or laptop PC) or 1102 discussed above. Thus, the interactions described above between the PAD and the user device (e.g., between the PAD 504 and the user device 502), including but not limited to the interactions described with reference to the method 400 (FIG. 4), may equivalently be performed between the PAD and the user device 1200. In some examples, the merchant virtual storefront, as discussed with reference to the embodiments disclosed herein, may include a merchant website accessed through a mobile application (app) executing on the user device 1200. The user device 1200 includes a chassis 1202 having a display 1204 and an input device including the display 1204 and a plurality of input buttons 1206. One of skill in the art will recognize that the user device 1200 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 13:
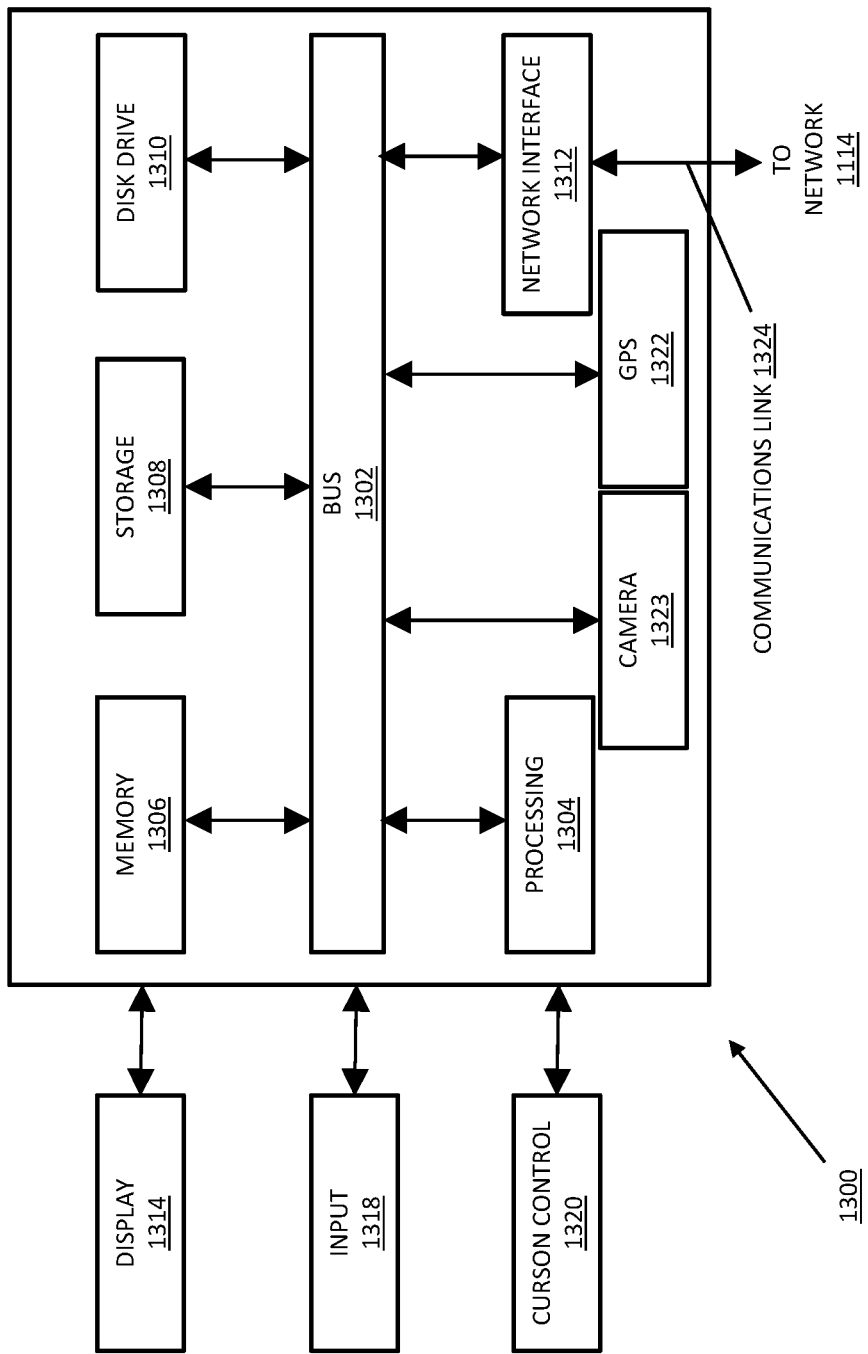
FIG. 13 is a schematic view illustrating an embodiment of a computer system.

Referring now to FIG. 13, an embodiment of a computer system 1300 suitable for implementing, for example, the user device 102, 502, or 1102, merchant device 1104, beacon devices 200 or 1106, payment service provider device 108, 1112, account provider device(s) 1108, third-party approver device 902, 1107 and/or payment authorization devices 104, 504, 700, 1105, is illustrated. It should be appreciated that other devices utilized by customers, merchants, beacon devices, merchant beacon communication devices, payment service providers, account provider device(s), third-party approver devices, and/or payment authorization devices in the system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location determination component 1322 (e.g., a Global Positioning System (GPS) device as illustrated, a cell tower triangulation device, and/or a variety of other location determination devices known in the art), and/or a camera component 1323. In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the user device 102, 502, or 1102, merchant device 1104, beacon devices 200 or 1106, payment service provider device 108, 1112, account provider device(s) 1108, third-party approver device 902, 1107 and/or payment authorization devices 104, 504, 700, 1105. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1114 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
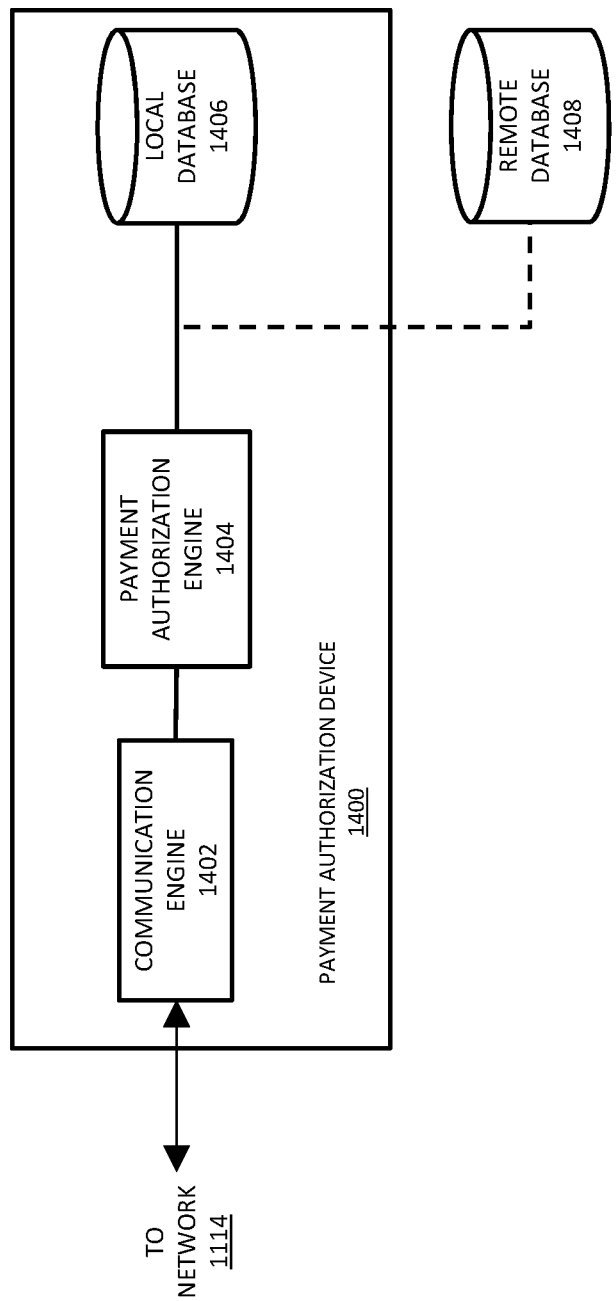
FIG. 14 is a schematic view illustrating an embodiment of a payment authorization device.

Referring now to FIG. 14, an embodiment of a payment authorization device 1400 is illustrated. In an embodiment, the payment authorization device 1400 may be the payment authorization devices discussed above. The payment authorization device 1400 includes a communication engine 1402 that is coupled to the network 1114 and to a payment authorization engine 1404 that is coupled to a local database 1406 and a remote database 1408, through the network 1114. The communication engine 1402 may be software or instructions stored on a computer-readable medium that allows the device 1400 to send and receive information over the network 1114. The payment authorization engine 1404 may be software or instructions stored on a computer-readable medium that, when executed by a processor, is configured to receive, in association with a merchant virtual storefront transaction request, a request to authenticate the merchant virtual storefront over a network from a user device, retrieve identifying information associated with the merchant virtual storefront over the network from the user device, determine an authenticity of the merchant virtual storefront, and authorize the merchant virtual storefront transaction request, as well as provide any of the other functionality that is discussed above. While the database 1406 has been illustrated as located in the device 1400, one of skill in the art will recognize that it may also be connected to the payment authorization engine 1404 through the network 1114 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a payment authorization device comprising one or more hardware processors configured to execute instructions that cause the payment authorization device to perform operations comprising:
actively detecting, prior to a transmission of information related to a payment portion of a purchase transaction to a payment provider and via a communication with a web browser plug-in that executes a background event detection application on a user device while the user device displays a merchant virtual storefront and based on a communication with the user device, an event associated with a merchant virtual storefront transaction request that was initiated by the user device, wherein the detected event includes an attempt to add an item to a virtual cart, wherein the user device is separate from the payment authorization device, and wherein the payment authorization device is a proxy between the user device and the payment provider;
in response to the actively detecting, automatically initiating an authentication of the merchant virtual storefront associated with the merchant virtual storefront transaction request;
matching identifying information associated with the merchant virtual storefront, the identifying information received from the user device including the web browser plug-in that executes the background event detection application, with baseline identifying information stored in a database, wherein the baseline identifying information identifies known authentic websites;
determining, based on the matching, that the merchant virtual storefront is authentic;
after determining that the merchant virtual storefront is authentic, authorizing adding the item to the virtual cart and the merchant virtual storefront transaction request; and
causing a transmission of user payment account information to the user device, wherein the transmission of the user payment account information automatically populates payment information fields within the merchant virtual storefront that enables a completion of at least the payment portion of the purchase transaction via the merchant virtual storefront.

2. The system of claim 1, wherein the actively detecting the event and the automatically initiating the authentication of the merchant virtual storefront are performed by the payment authorization device without explicit instructions from the user device.

3. The system of claim 1, wherein the detected event further includes a browsing of the merchant virtual storefront, proceeding to a checkout portion of the merchant virtual storefront, or an attempt to pay for an item.

4. The system of claim 1, wherein the identifying information and the baseline identifying information include a hypertext markup language (HTML), metadata, secure sockets layer (SSL) data, an IP address, a website URL, DNS data, or TCP/IP data.

5. The system of claim 1, wherein the operations performed by the payment authorization device further comprise: retrieving the baseline identifying information from a local database or a remote database.

6. The system of claim 1, wherein the operations performed by the payment authorization device further comprise:
prior to the authorizing the merchant virtual storefront transaction request, transmitting an approval request over a network to a third-party approver; and
receiving a decision to the approval request from the third-party approver.

7. The system of claim 1, wherein the operations performed by the payment authorization device further comprise:
displaying, through a graphical user interface, an authentication message that indicates an authenticity of the merchant virtual storefront; and
based on the authentication message, receiving a user confirmation prior to the authorizing the merchant virtual storefront transaction request.

8. The system of claim 1, wherein the authorizing the merchant virtual storefront transaction request includes completing, by the payment authorization device, the payment portion for the purchase transaction.

9. The system of claim 1, wherein the operations performed by the payment authorization device further comprise:
in response to the authorizing the merchant virtual storefront transaction request, retrieving the user payment account information; and
transmitting the user payment account information to the payment provider, wherein the user payment account information is configured to allow the payment provider to transfer funds to a merchant account associated with the merchant virtual storefront.

10. The system of claim 1, wherein the operations performed by the payment authorization device further comprise:
in response to determining that the merchant virtual storefront is authentic, automatically authorizing, based on one or more user preferences stored in the database, the merchant virtual storefront transaction request, wherein the transmission is in response to the automatically authorizing.

11. The system of claim 10, wherein the one or more user preferences include a list of user-authorized merchant websites, a list of user-approved categories, an amount of the purchase transaction, or a type of transaction.

12. The system of claim 6, wherein the third-party approver has authority over a user payment account being used in association with the merchant virtual storefront transaction request.

13. A method, comprising:
actively detecting, prior to a transmission of information related to a payment portion of a purchase transaction to a payment provider and by a payment authorization device in a communication with a web browser plug-in that executes a background event detection application on a user device while the user device displays a merchant virtual storefront and based on a communication with the user device, an event associated with a merchant virtual storefront transaction request that was initiated by the user device, wherein the detected event includes an attempt to add an item to a virtual cart, wherein the user device is separate from the payment authorization device, and wherein the payment authorization device is an intermediary between the user device and the payment provider;
in response to the actively detecting, automatically initiating, by the payment authorization device, an authentication of the merchant virtual storefront associated with the merchant virtual storefront transaction request;

comparing, by the payment authorization device, identifying information associated with the merchant virtual storefront, the identifying information received from the user device including the web browser plug-in that executes the background event detection application, with baseline identifying information stored in a database, the baseline identifying information including a whitelist that identifies authentic websites and a blacklist that identifies fraudulent websites;

determining, based on the comparing and by the payment authorization device, that the merchant virtual storefront is authentic;

after determining that the merchant virtual storefront is authentic, transmitting, by the payment authorization device, an approval request over a network to a third-party approver, wherein the third-party approver has authority over a user payment account being used in association with the merchant virtual storefront transaction request;

after receiving a decision to the approval request from the third-party approver, authorizing, by the payment authorization device, the merchant virtual storefront transaction request; and transmitting, by the payment authorization device, user payment account information to the user device, wherein the transmitting the user payment account information automatically populates payment information fields within the merchant virtual storefront that enables a completion of at least the payment portion of the purchase transaction via the merchant virtual storefront.

14. The method of claim 13, further comprising: retrieving the baseline identifying information from a local database or a remote database.

15. The method of claim 13, further comprising:
in response to the authorizing the merchant virtual storefront transaction request, retrieving the user payment account information; and
transmitting the user payment account information to the payment provider, wherein the user payment account information is configured to allow the payment provider to transfer funds to a merchant account associated with the merchant virtual storefront.

16. The method of claim 13, wherein the authorizing the merchant virtual storefront transaction request is performed based on one or more user preferences.

17. A non-transitory machine-readable medium having stored thereon machine-readable instructions executable to cause one or more machines to perform operations comprising:
actively detecting, prior to a transmission of information related to a payment portion of a purchase transaction to a payment provider and by a payment authorization device in a communication with a web browser plug-in that executes a background event detection application on a user device while the user device displays a merchant virtual storefront and based on a communication with the user device, an attempt to add an item to a virtual cart in connection with a merchant virtual storefront transaction request that was initiated by the user device, wherein the user device is separate from the payment authorization device, and wherein the payment authorization device is an intermediary between the user device and the payment provider;

in response to the actively detecting, automatically initiating, by the payment authorization device, an authentication of the merchant virtual storefront associated with the merchant virtual storefront transaction request;

detecting, by the payment authorization device, a presence or absence of fraudulent data within identifying information associated with the merchant virtual storefront, the identifying information received from the user device including the web browser plug-in that executes the background event detection application;

determining, based on the detected absence of fraudulent data within the identifying information and by the payment authorization device, that the merchant virtual storefront is authentic;

after determining that the merchant virtual storefront is authentic, authorizing, by the payment authorization device, adding the item to the virtual cart and the merchant virtual storefront transaction request; and transmitting, by the payment authorization device, user payment account information to the user device, wherein the transmitting the user payment account information automatically populates payment information fields within the merchant virtual storefront that enables a completion of at least the payment portion of the purchase transaction via the merchant virtual storefront.

18. The non-transitory machine-readable medium of claim 17, wherein the operations further comprise: retrieving the baseline identifying information from a local database or a remote database.

19. The method of claim 13, wherein the method further comprises:
after determining that the merchant virtual storefront is authentic, authorizing, by the payment authorization device, adding the item to the virtual cart.

20. The non-transitory machine-readable medium of claim 17, wherein the operations further comprise:
after determining that the merchant virtual storefront is authentic, transmitting, by the payment authorization device, an approval request over a network to a third-party approver having authority over a user payment account being used in connection with the merchant virtual storefront transaction request; and
after receiving a decision to the approval request from the third-party approver, authorizing, by the payment authorization device, the merchant virtual storefront transaction request.

* * * * *